United States Patent
Childs et al.

(10) Patent No.: US 10,365,998 B2
(45) Date of Patent: Jul. 30, 2019

(54) MODIFYING MONITORING CONFIGURATIONS THAT SUPPORT ANALYTICS PROGRAMS

(71) Applicant: International Business Machines Corporation, Armonk, NY (US)

(72) Inventors: Bryan C. Childs, Poughkeepsie, NY (US); Anthony T. Sofia, Highland, NY (US); Elpida Tzortzatos, Lagrangeville, NY (US)

(73) Assignee: International Business Machines Corporation, Armonk, NY (US)

( * ) Notice: Subject to any disclaimer, the term of this patent is extended or adjusted under 35 U.S.C. 154(b) by 614 days.

(21) Appl. No.: 14/852,923

(22) Filed: Sep. 14, 2015

(65) Prior Publication Data

US 2017/0075942 A1 Mar. 16, 2017

(51) Int. Cl.
*G06F 12/02* (2006.01)
*G06F 16/17* (2019.01)
*G06F 15/173* (2006.01)

(52) U.S. Cl.
CPC ........ *G06F 12/023* (2013.01); *G06F 16/1727* (2019.01)

(58) Field of Classification Search
CPC .................................................. G06F 12/023
USPC ....................................................... 711/200
See application file for complete search history.

(56) References Cited

U.S. PATENT DOCUMENTS

| 8,412,690 B2 | 4/2013 | Hermann et al. |
| 2002/0174138 A1* | 11/2002 | Nakamura ........ G06F 17/30595 |
| 2011/0131208 A1 | 6/2011 | Goldfarb et al. |
| 2012/0265728 A1 | 10/2012 | Plattner et al. |
| 2013/0086547 A1* | 4/2013 | Said .......................... G06F 8/73 717/104 |
| 2013/0339514 A1* | 12/2013 | Crank ................. H04L 63/1408 709/224 |

OTHER PUBLICATIONS

"Enhanced Peer to Peer DVR Recording Methods", An IP.com Prior Art Database Technical Disclosure, Publication Date: May 6, 2009, IP.com No. 000182827, 11 pages.

(Continued)

*Primary Examiner* — Gautam Sain
(74) *Attorney, Agent, or Firm* — Daniel R. Simek (57) ABSTRACT

A method for obtaining and storing monitoring information. The method includes one or more computer processors generating a plurality of data records, based at least in part on a configuration for generating information, wherein the plurality of data records includes a first data record. The method further includes determining that a configuration for analyzing information dictates an analysis of at least a one data record, wherein the at least one data record includes a second data record. The method further includes determining that the plurality of data records do not include the second data record. The method further includes modifying the configuration for generating information to include generating the second data record. The method further includes generating an updated plurality of data records based on the modified configuration for generating information, wherein the updated plurality of data records includes the first data record and the second data record.

20 Claims, 5 Drawing Sheets

(56) References Cited

OTHER PUBLICATIONS

"A System Method for Maintaining in Memory Data Objects with No Loss of Data Availability", An IP.com Prior Art Database Technical Disclosure, Publication Date: Apr. 29, 2013, IP.com No. 000226975, 7 pages.

* cited by examiner

MODIFYING MONITORING CONFIGURATIONS THAT SUPPORT ANALYTICS PROGRAMS

BACKGROUND OF THE INVENTION

The present invention relates generally to the field of data processing, and more particularly to incorporating memory buffers to store data generated by a monitoring application of a computing system.

System and application monitoring products are the foundation of business service management for end-to-end information technology (IT) service automation. Monitoring products ensure the computing systems hosting the applications of a customer and the hosted application of the customer both run well and are under control. A monitoring function may be highly tunable to allow for the monitoring of issues such as: network performance, improvements to applications as part of a development life-cycle, appropriate levels of detail, etc. Some businesses and IT organizations configure monitoring products for a customer. Other businesses utilize an "as a Service" business model, in which a customer purchases and installs monitoring services without the intervention of a system administrator.

Customers expect efficient monitoring. Monitoring should be scalable and timely. In addition, monitoring should minimally impact the system resources (e.g., persistent storage space) for which a customer pays. Various aspects of a system and/or of an application may be monitored, such as: intrusion detection, resource utilization, application utilization, quality-of-service, network traffic, demand spikes, etc. Monitoring information may be stored as records in a database and/or in log files.

In addition to monitoring products and services, a customer can utilize real-time and/or long-term analytics on the computing system producing the monitoring information, as opposed to communicating the monitoring information to another computing system (e.g., in-house) and analyzing the monitoring data off line. Examples of real-time analysis of monitoring information include load balancing and fraud prevention.

SUMMARY

According to aspects of the present invention, there is a method, computer program product, and/or system for obtaining and storing monitoring information. The method includes one or more computer processors generating a plurality of data records, based at least in part on a configuration for generating information, wherein the plurality of data records includes a first data record. The method further includes one or more computer determining that a configuration for analyzing information dictates an analysis of at least a one data record, wherein the at least one data record includes a second data record. The method further includes one or more computer determining that the plurality of data records does not include the second data record. The method further includes one or more computer modifying the configuration for generating information to include generating the second data record. The method includes one or more computer processors generating an updated plurality of data records based on the modified configuration for generating information, wherein the updated plurality of data records includes the first data record and the second data record.

DETAILED DESCRIPTION

Embodiments of the present invention recognize that, historically, administrators of computing systems (e.g., a computing cluster, enterprise systems, etc.) controlled system monitoring, event logging, and the associated applied analytics. The system administrators had control over the monitoring data (e.g., logged events, system resource allocations, software application metrics, etc.) collected and the analytics applied to the collected data to ensure meeting the requirements of the analytics programs. In addition, system administrators were able to manage the size of the monitoring data and control the auxiliary storage costs associated with preserving the monitoring data and associated analytics.

Embodiments of the present invention recognize that in various computing environments, a user of a computing system may not be associated with an organization owning the computing system. A user may host a plurality of applications and programs on the computing system through various "as a Service" business models provided by the owners of the computing system. In various "as a Service" solutions, a user may be responsible for: selecting monitoring applications (apps), configuring the selected monitoring applications, selecting analytics programs, and configuring the selected analytics programs. Since a user is operating on a computing system via costed resources (e.g., RAM, cores, flash memory, hard-disk space, etc.) and services, a user may make cost-based decisions when configuring a monitoring application that adversely affects an analytics program. In addition, persistent (i.e., long-term) storage utilized by embodiments of the present invention can exist on a computing device of a user and/or a storage solution, such as a network-attached storage (NAS) system and/or a storage area network (SAN), either of which is accessible to the computing system utilized by the user.

Embodiments of the present invention also recognize that the capability of analytics have improved, enabling computing systems to process structured and/or unstructured monitoring data associated with events. However, storage of the structured and/or unstructured data obtained via monitoring may consume more persistent storage than a user can allocate or afford.

Embodiments of the present invention provide multiple solutions to obtain the monitoring data (e.g., data records) utilized by an analytics program. A data record may include a header (e.g., identification information, metadata, etc.) and a payload (e.g., monitored data). An embodiment of the present invention eliminates user intervention and/or administrative intervention by automatically modifying the configuration of a monitoring app to meet the requirements (e.g., additional data records) associated with an analytical program utilized by the user. Some embodiments of the present invention may communicate with a user prior to modifying a configuration file. Other embodiments of the present invention configure one or more memory buffers to temporarily store the additional data records generated by a monitoring app that are utilized by an analytics program. By utilizing memory buffers (sometime called in-memory storage) for data record storage during the analysis of monitoring data, embodiments of the present invention may reduce impacts to allocation (e.g., capacity plan of a user) of persistent memory for log files. Embodiments of the present invention can configure memory buffers from volatile memory, flash memory, or a combination thereof.

Another embodiment of the present invention can determine which types of data records or recorded information are important (e.g., a status) to a user. This embodiment may allocate one or more storage locations (e.g., memory buffers) to one or more record types that may be associated with transient events or include a low percentage of relevant information. In addition, an embodiment of the present invention can modify the configuration file of a monitoring application to direct the one or more record types to a memory buffer as opposed to persistent storage. Some embodiments of the present invention may modify a configuration file for a monitoring application to direct one or more record types to a memory buffer and a persistent memory location. An embodiment of the present invention enables an analytics program to dictate which data records stored in a memory buffer are communicated to persistent storage, and which data records are deleted. This is relevant to, but not limited to, events that rapidly generate data records within a short period of time. Other embodiments of the present invention identify monitoring data related to transient events. The monitoring data related to the transient events is analyzed with short-term analytics that may aggregate the monitoring data into metadata records. In addition, the aggregated metadata related to transient events may be stored (e.g., in persistent storage) by a computing system for subsequent long-term uses as opposed to being deleted from memory buffers and lost. For example, an analytics program may generate a report for a user that includes links to the metadata records, which the user may import to a different analytics program.

Some embodiments of the present invention include one or more indications, in the form of metadata, with data records generated by a monitoring app. An indication included in the monitoring data may affect: the data type associated with a data record, the storage of a data record, and/or the persistence of a data record. In an embodiment, an indication associated with a data record may be modified, augmented, and/or deleted. For example, an indication associated with one data record may be modified to direct the data record to multiple storage locations where each storage location may be accessed by a different analytics program or buffered prior to communication to persistent storage. In addition, an embodiment of the present invention may detect an occurrence (e.g., log an event) of a previously unutilized record type and save an unutilized data record type to a storage location. Based on the event that logged the previously unutilized data record type, a computing system may save the unutilized data record type to: a memory buffer, persistent storage, or a combination thereof.

Further embodiments of the present invention may test modifications to a monitoring app and/or an analytical program without the intervention of a user. For example, a configuration file for a modified analytical program configures one or more memory buffer and/or persistent storage locations for the additional records that are utilized by the modified analytical program. The configured memory buffers and/or persistent storage locations are allocated from resources of a computing system without affecting the resources allocated to a user. An embodiment of the present invention may communicate information related to a modification and solicit feedback. Another embodiment of the present invention may reduce the administrative costs associated with implementing a modified monitoring app and/or a modified analytical program on a computing system utilized by a user.

The descriptions of the various scenarios, instances, and examples related to the present invention have been presented for purposes of illustration or providing additional details but are not intended to be exhaustive or limited to the embodiments disclosed.

Figure 1:
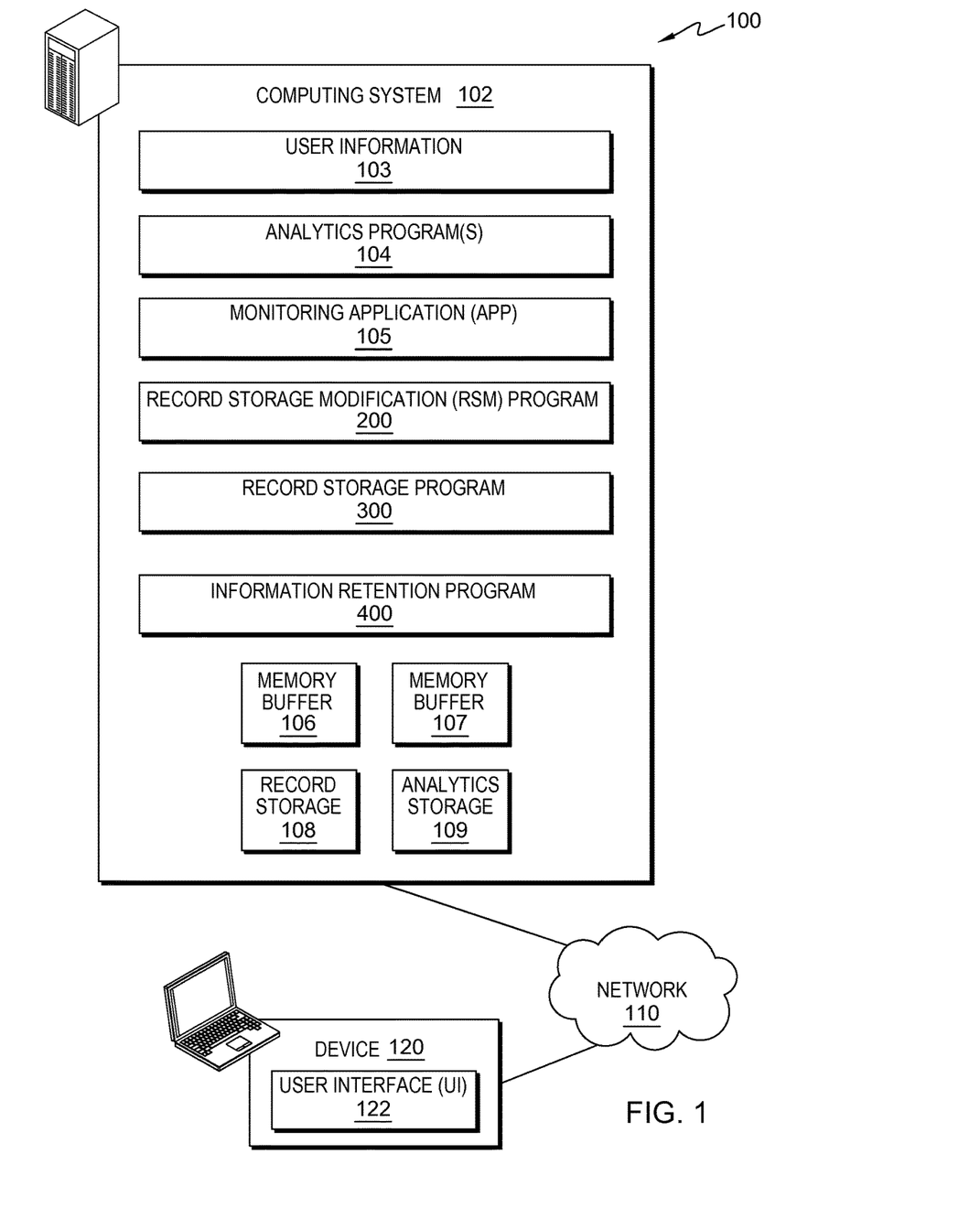
FIG. 1 illustrates a distributed computing environment, in accordance with an embodiment of the present invention.

The present invention will now be described in detail with reference to the Figures. FIG. 1 is a functional block diagram illustrating distributed computing environment 100 in an embodiment, in accordance with the present invention. An embodiment of distributed computing environment 100 may include: computing system 102 and device 120 interconnected over network 110. Many modifications to the depicted environment may be made by those skilled in the art without departing from the scope of the invention as recited by the claims.

Computing system 102 and device 120 may be laptop computers, tablet computers, netbook computers, personal computers (PC), desktop computers, personal digital assistants (PDA), smart phones, wearable devices (e.g., digital eyeglasses, smart glasses, a smart watch), or any programmable computer systems known in the art. In certain embodiments, computing system 102 and device 120 represent computer systems utilizing clustered computers and components (e.g., database server computers, application server computers, etc.) that act as a single pool of seamless resources when accessed through network 110, as is common in data centers and with cloud-computing applications. In general, computing system 102 and device 120 are representative of any programmable electronic device or combination of programmable electronic devices capable of executing machine readable program instructions and communicating with users utilizing computing system 102 and device 120 via network 110. Computing system 102 and device 120 may include components, as depicted and described in further detail with respect to FIG. 5, in accordance with embodiments of the present invention.

Computing system 102 includes user information 103, analytics program(s) 104, monitoring application (app) 105, memory buffer 106, memory buffer 107, record storage 108, analytics storage 109, record storage modification (RSM) program 200, record storage program 300, information retention program 400, and various programs and databases (e.g., a website interface, middleware software, one or more user applications, information corresponding to the various user programs, etc.) (not shown). In some embodiments, computing system 102 obtains a new and/or updated analytics program(s) 104 and/or monitoring app 105 from another system (not shown) accessed via network 110.

In one embodiment, computing system 102 and device 120 communicate through network 110. Network 110 can be, for example, a local area network (LAN), a telecommunications network, a wireless local area network (WLAN), such as an intranet, a wide area network (WAN), such as the Internet, or any combination of the previous, and can include wired, wireless, or fiber optic connections. In general, network 110 can be any combination of connections and protocols that will support communications between computing system 102 and device 120, in accordance with embodiments of the present invention. In another embodiment, network 110 operates locally via wired, wireless, or optical connections and can be any combination of connections and protocols (e.g., near field communication (NFC), laser, infrared, etc.).

In one embodiment, user information 103 includes information associated with a user of computing system 102. Examples of information associated with a user include: computing system resource allocations; billing information; end-user license agreement; and the one or more programs, applications, databases, web clients, networking functions, etc. (not shown) on computing system 102. In another embodiment, user information 103 includes one or more configuration files associated with analytics program(s) 104 and/or monitoring app 105. In an example, information included in a configuration file may include: a list of generated data records, a list of analyzed data records, a frequency of data collection, a frequency of record generation, a frequency of analysis, triggering events, indications associated with records, etc. Examples of indications that may be associated with a data record are: a persistence criterion of the data record, a storage location for the data record (e.g., a memory buffer, persistent storage), a location of the results of an analysis of data records, etc.

In some scenarios, user information 103 includes one or more configuration files that are generated during the installation of monitoring app 105. In one scenario, user information 103 includes a default configuration file that is created by a program (not shown) that installs monitoring app 105 for a user of device 120. In another scenario, user information 103 includes a configuration file that was created and/or modified prior to, during, or after the installation of monitoring app 105. In one example, a user configures monitoring app 105 to record data that is familiar to the user. In another example, a user inputs a storage constraint (e.g., maximum log file size) during the installation of monitoring app 105. An application installation program (not shown) of computing system 102 facilitates the installations of analytics program(s) 104 and monitoring app 105 and prioritizes the data records that are generated and/or stored based on the storage constraints defined by the user.

In some embodiments, user information 103 may include one or more user preferences. Some example of user preferences may include: a frequency of communication of results to a user, a list of provisioned computing resources for computing system 102, default values for elements (e.g., storage locations, data types, etc.) not specified within a configuration, a frequency of the compaction (e.g., deleting, migrating to tape storage, transferring to device 120, etc.) of log files, and/or results, etc. In other embodiments, user information 103 includes user information that enables communication between computing system 102 and device 120. In one example, user information 103 may include a definition for a communication protocol and associated authentication information. In another example, user information 103 includes user preferences utilized by user interface (UI) 122 during communications between computing system 102 and device 120.

In some embodiments, analytics program(s) 104 is a suite of analytics programs that is utilized by a user and/or an administrator of computing system 102. An analytics program within the suite of programs comprising analytics program(s) 104 may be configured to detect, identify, or determine patterns, instances, and/or correlations within the information (e.g., data records) generated by monitoring app 105. In one embodiment, analytics program(s) 104 analyzes data records that are stored in memory buffers to determine transient, real-time, and/or near real-time events and/or patterns. For example, monitoring app 105 may be configured to detect intrusion events; however, analytics program(s) 104 may determine that the intrusion events are directed against specific users from common Internet protocol addresses (IP addresses). In another embodiment, analytics program(s) 104 may analyze data records from monitoring app 105 for a period of time and then communicate, via network 110, a summary report to a user of device 120.

In addition, analytics program(s) 104 may analyze a combination of system and application information generated by monitoring app 105. In some embodiments, this analysis is part of application performance management (APM) to determine whether one or more applications on computing system 102 (not shown) perform to a set of metrics. In some embodiments, a set of metrics for APM are received as input based on an agreement between a user and an owner/administrator of computing system 102.

In one embodiment, monitoring app 105 may monitor various aspects of a system, such as intrusion detection, resource utilization, and/or network traffic, etc. In another embodiment, monitoring app 105 may monitor various aspects of an application. For example, monitoring app 105 monitors: application utilization, quality of service, and/or demand spikes, etc. Monitoring app 105 generates a plurality of records corresponding to various aspects of a system and/or an application based on controls, triggers, and parameters defined for a configuration file associated with monitoring app 105. In some embodiments, monitoring app 105 generates and/or identifies data records based on record types related to the operating system of computing system 102. In an example, the operating system of computing system 102 may identify data record types by numeric values that correspond to a parameter that affects computing system 102, such as record type 4 corresponds to a programming language of an application, and record type 19 corresponds to central processing unit (CPU) usage. In other embodiments, monitoring app 105 may apply a record type to generated data records based on descriptions associated with monitored parameters, such as, application number, file name, IP address, etc. In an embodiment, monitoring app 105 generates records that may include sub-records. In an example: record type 19.1 corresponds to time-based CPU usage, record type 19.2 corresponds to a number of CPU core utilizes, and record type 19.33 corresponds to floating point operations per second (FLOPS) of CPU effort consumed. In various embodiments, monitoring app 105 may structure the generated data records for storage in databases and/or in log files.

Memory buffer 106 and/or memory buffer 107 are blocks of memory that store information obtained from monitoring app 105. In an embodiment, memory buffer 106 and/or memory buffer 107 are temporary storage for transient events analyzed by analytics program(s) 104. In addition, information and data records stored in memory buffer 106 and/or memory buffer 107 may include persistence criteria, such as time, usage, a triggering event, and/or a termination of a monitored application that dictate when information or a data record is removed from memory. In other embodiments, memory buffer 106 and/or memory buffer 107 are derived from memory (e.g., random access memory, flash memory) of computing system 102 that is allocated to a user of computing system 102. In another embodiment, memory buffer 106 and/or memory buffer 107 are derived from unallocated (e.g., unassigned) memory of computing system 102 that may be utilized by one or more administrative (e.g., control) functions of computing system 102. In an alternative embodiment, memory buffer 106 and/or memory buffer 107 include one or more tables associated with an in-memory based database. In various embodiments, memory buffer 106 and/or memory buffer 107 may be configured as RAM disks (e.g., virtual drives) to mimic data storage based on a file system of a persistent storage device (e.g., a hard disk).

In one embodiment, record storage 108 is a portion of persistent storage allocated from persistent storage assigned (e.g., provisioned, purchased, dedicated, etc.) to a user utilizing computing system 102. Record storage 108 stores information and data records generated by a monitoring app 105 based on a configuration file associated with monitoring app 105. In one scenario, record storage 108 is persistent storage utilized by (e.g., allocated to) a user based on a configuration file defined by the user when the user installed (e.g., selected) monitoring app 105. In another scenario, record storage 108 is persistent storage utilized by a user based on a default, system-defined configuration file utilized when a user installed monitoring app 105.

In one embodiment, analytics storage 109 is persistent storage that includes one or more records not included in record storage 108. In another embodiment, analytics storage 109 includes event logs that correspond to one or more records generated by monitoring app 105. In one scenario, a set of event logs are included in each analytics storage 109 and record storage 108. In another scenario, analytics program(s) 104 utilize logical operation to ensure that data records comprising an event log that are not stored within record storage 108 are stored within analytics storage 109. In some embodiments, analytics storage 109 includes databases for the records generated by monitoring app 105 and the results of one or more analytics program(s) 104 utilized to analyze records generated by monitoring app 105. In some scenarios, information (e.g., records, results, etc.) saved to analytics storage 109 may be accessed by a user to further reconstitute events that monitoring app 105 and/or analytics program(s) 104 communicated to the user. In other embodiments, analytics storage 109 includes the results of one or more executions of instances of analytics program(s) 104 defined by an administrator of computing system 102. For example, analytics storage 109 includes aggregated monitoring information of a plurality of users that execute monitoring app 105. An administrator of computing system 102 analyzes the aggregation of monitoring data within analytics storage 109 to determine whether monitoring app 105 generates data records that describe and/or identify events that monitoring app 105 is designed to capture.

Figure 2:
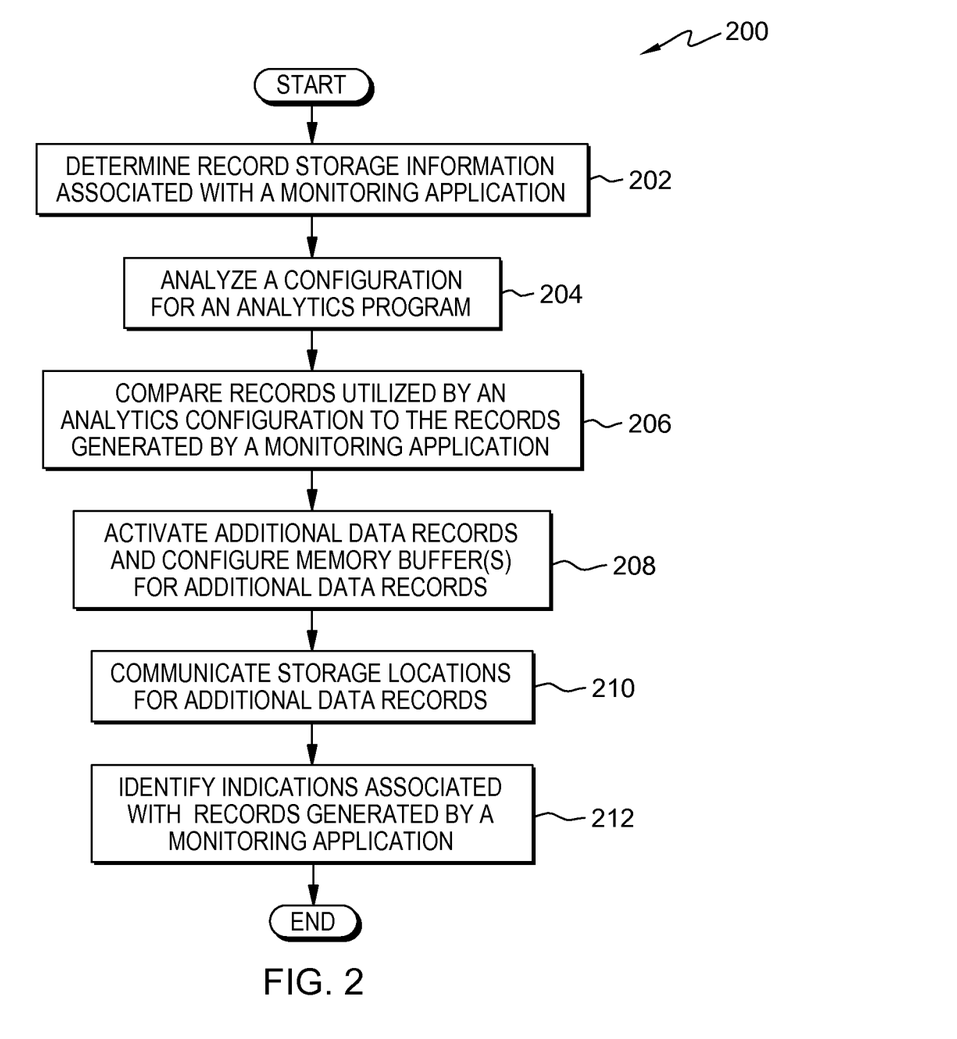
FIG. 2 depicts a flowchart of the operational steps of a record storage modification program, in accordance with an embodiment of the present invention.

RSM program 200 determines whether a monitoring application, installed on computing system 102, generates a plurality of data records that are utilized by an analytics program configured by a user. RSM program 200 modifies the configuration file (e.g., activates the generation of data records) of a monitoring application to generate additional data records not included in the plurality of data records utilized by the configured analytics program. In addition, RSM program 200 configures one or more storage locations (e.g., memory buffers, persistent storage) of one or more additional data records generated by a monitoring application that are utilized by the configured analytics program. In addition, RSM program 200 determines whether the one or more activated records are stored: in memory buffer 106, in memory buffer 107, in persistent storage (e.g., record storage 108, analytics storage 109), in summary information output by an instance of analytics program(s) 104, or in any combination thereof. In some embodiments, RSM program 200 identifies one or more indications (e.g., metadata, flags, etc.) associated with the plurality of records and the additional one or more data records generated by a monitoring application. The one or more indications identified by RSM program 200 may affect: when a record is stored (e.g., a frequency); where a record is stored (e.g., a storage location); and whether a user-defined record indication within a configuration file is overridden.

Figure 3:
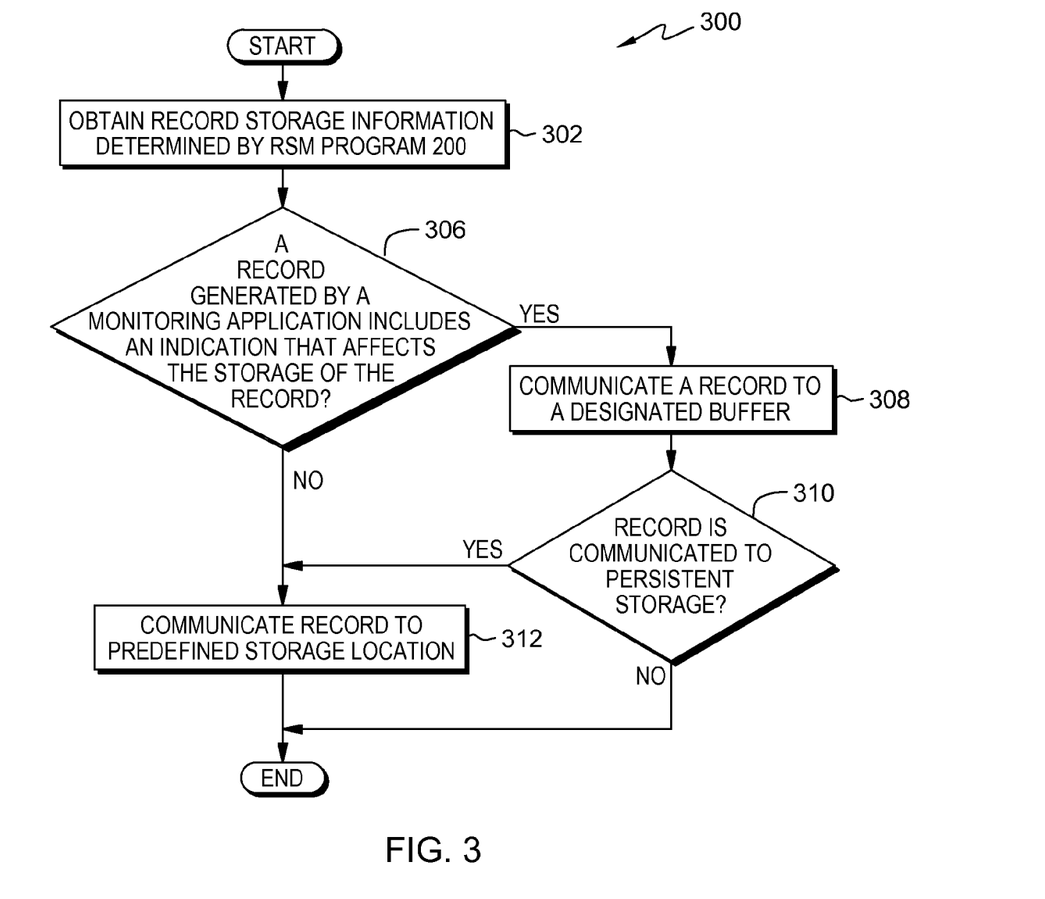
FIG. 3 depicts a flowchart of the operational steps of a record storage program, in accordance with an embodiment of the present invention.

Record storage program 300 obtains information from RSM program 200 and an analytics program to communicate data records generated by a monitoring application to a designated memory buffer and/or a predefined persistent storage location. In some embodiments, record storage program 300 responds to indicia associated with a data record. Record storage program 300 may access user information 103 to determine the effect an indication associated with a data record has on the storage of the data record.

Figure 4:
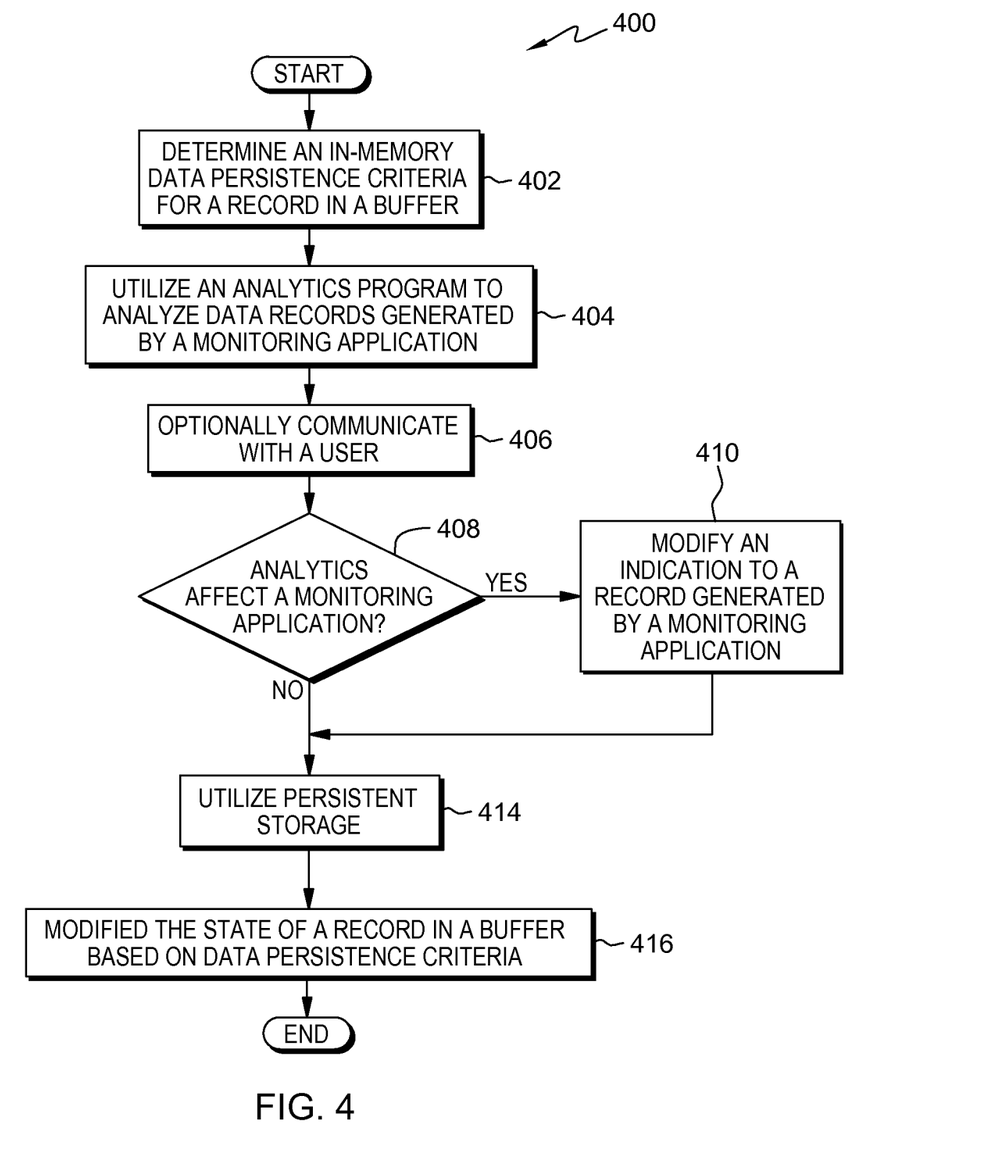
FIG. 4 depicts a flowchart of the operational steps of an information retention program, in accordance with an embodiment of the present invention.

Information retention program 400 controls the preservation or deletion of information within a memory buffer. Information retention program 400 may utilize criteria, such as time, a triggering event, and/or results of an analytics program, etc., to determine when a data record is deleted (e.g., removed from a memory buffer). In some embodiments, information retention program 400 may trigger the execution of an analytics program to analyze data records generated by a monitoring application. In addition, information retention program 400 may affect when a data record is included in persistent storage and which one or more persistent storage locations are utilized for the storage of the data record. In other embodiments, information retention program 400 modifies the state of a data record in a memory buffer based on data persistence criteria associated with a data record. For example, information retention program 400 may determine that a data record is utilized by various analytics programs. Until all analytics programs that utilize a data record in a common memory buffer consume the data record, the data record persists (e.g., state=do not delete).

Device 120 includes UI 122 and various programs and databases (e.g., a website interface, middleware software, one or more user applications, information corresponding to the various user programs, etc.) (not shown). In an embodiment, UI 122 accepts input from a plurality of input/output (I/O) devices (not shown) including, but not limited to, a tactile sensor interface (e.g., a touch screen, a touchpad) or a natural user interface (e.g., voice control unit, motion capture device, eye tracking, cyberglove, head-up display, etc.). An I/O device interfacing with a UI 122 may be connected to a device 120 which may operate utilizing wired connection, such as a universal serial bus port (USB™ port) or wireless network communications (e.g., infrared, NFC, etc.). For example, an I/O device may be a peripheral that provides input from a user, such as a keyboard, a mouse, a trackball, or a click wheel. In some embodiments, a user of device 120 can interact with UI 122 via a singular interface device, such as a display (e.g., a touch screen). The interface device of device 120 may act as both an input to a graphical user interface (GUI) and an output device (e.g., a display) presenting a plurality of icons associated with software applications or images depicting the executing software application.

In other embodiments, a software application (e.g., a web browser) can generate UI 122 operating within the GUI of device 120. In an example, a user initiates a virtual private network (VPN) connection between device 120 and computing system 102. UI 122 is a graphical representation of one or more programs (e.g., monitoring app 105) executing on computing system 102. In another example, device 120 may receive communications from computing system 102 via network 110. UI 122 displays the information from: one or more programs of analytics program(s) 104, monitoring app 105, and/or information retention program 400.

FIG. 2 is a flowchart depicting operational steps for RSM program 200, a program for determining whether the data records utilized by a configuration of an analytics program are generated by a monitoring application. If RSM program 200 determines that a monitoring application does not generate one or more records utilized by a configuration of an analytics program (e.g., data records are omitted), then RSM program 200 activates the generation of data records by modifying a configuration file of the monitoring application, in accordance with embodiments of the present invention. In addition, RSM program 200 configures one or more additional storage locations for the one or more activated data records generated by a monitoring application and/or the results determined by an analytics program. RSM program 200 may identify indicia that are included with a data record generated by a monitoring application that affects the storage of the data record.

In step 202, RSM program 200 determines the record storage information associated with a monitoring application. In an embodiment, RSM program 200 utilizes a configuration file associated with monitoring app 105 to determine which data records are generated by monitoring app 105. RSM program 200 determines which data records are saved to persistent storage. In one scenario, RSM program 200 determines the data records that are stored in record storage 108. In another scenario, RSM program 200 determines the data records that are communicated via network 110 and stored on device 120. In some embodiments, RSM program 200 may determine that the storage location defined for a data record may be affected by the information contained within the data record. For example, a data record of access attempts from internal network addresses is stored on one location and the data record of access attempts from external network addresses (e.g., IP addresses) is stored in another location.

In step 204, RSM program 200 analyzes a configuration for an analytics program. RSM program 200 utilizes a configuration file associated with an analytics program to determine the data records utilized by an analytics program. In addition, RSM program 200 may determine that a configuration for an analytics program includes one or more indications dictating that a data record is stored in a memory buffer on computing system 102. In an embodiment, RSM program 200 analyzes a user created configuration file stored in user information 103 to determine which data records are utilized (e.g., analyzed) by analytics program(s) 104. In another embodiment, RSM program 200 analyzes a default configuration file to determine which data records are utilized (e.g., analyzed) by analytics program(s) 104. Computing system 102 copies the default configuration file to user information 103 when a user elects to utilize analytics program(s) 104 in conjunction with monitoring app 105.

In some embodiments, RSM program 200 analyzes a configuration file associated with analytics program(s) 104 to determine which data records and/or reports produced by analytics program(s) 104 are saved to persistent storage. In one scenario, RSM program 200 determines the data records that are stored in record storage 108. In another scenario, RSM program 200 identifies the data records that are stored in analytics storage 109. In some scenarios, RSM program 200 communicates to a user of device 120, via network 110, the storage locations of one or more data records and/or reports produced by analytics program(s) 104. In other embodiments, RSM program 200 analyzes one or more configuration files to determine which data records are utilized by various analytics programs of the programs included in analytics program(s) 104. For example, RSM program 200 may determine that among five analytics programs configured by a user, three of the analytics programs utilize different groups of data records.

In step 206, RSM program 200 compares records utilized by an analytics configuration to the records generated by a monitoring application. In one embodiment, RSM program 200 compares a configuration file for analytics program(s) 104 to a configuration file for monitoring app 105 to determine which data records utilized by analytics program(s) 104 are not generated by monitoring app 105. In another embodiment, RSM program 200 monitors the storage locations (e.g., memory buffers, persistent storage) utilized by monitoring app 105 to determine which data records are generated by monitoring app 105. Subsequently, RSM program 200 determines which data records utilized by analytics program(s) 104 are not generated (e.g., omitted) by monitoring app 105. In an alternative embodiment, RSM program 200 identifies a data record generated by monitoring app 105 that is not utilized by a configuration of analytics program(s) 104. In one scenario, RSM program 200 determines that a different configuration for analytics program(s) 104 utilizes the identified data record. In another scenario, RSM program 200 applies (e.g., includes) an indication to the identified, unutilized data record.

In step 208, RSM program 200 activates additional data records and configures memory buffer(s) for additional data records. RSM program 200 activates one or more additional data records based on the comparison (step 206) of which data records an analytics program utilizes and which data records a monitoring application generates. In an embodiment, RSM program 200 modifies a configuration of monitoring app 105 to include the one or more additional data records. In some embodiments, RSM program 200 utilizes parameters (e.g., dictated default record generation), controlled by computing system 102, enabling monitoring app 105 to activate the generation of the omitted data records. In this instance, the user defined configuration file of monitoring app 105 is unmodified.

In addition, RSM program 200 configures memory buffer(s) for the one or more additional data records generated by a monitoring application. In an embodiment, RSM program 200 utilizes one or more files within user information 103 to determine where the additional one or more data records are stored, such as memory buffer 106 and/or memory buffer 107. In one scenario, RSM program 200 determines that sufficient storage is allocated to a user (e.g., a virtual machine on computing system 102) to allow the configuration of a memory buffer without affecting the user (e.g., increasing costs, affecting application performance, etc.). In another scenario, RSM program 200 determines that sufficient storage is not allocated to a user of computing system 102 to configure memory buffer(s) for the additional one or more data records generated by monitoring app 105. RSM program 200 allocates storage resources of computing system 102 (e.g., RAM, analytics storage 109) to configure the memory buffer(s) for the storage of the additional one or more data records generated by monitoring app 105. In another embodiment, RSM program 200 utilizes one or more default locations, defined (e.g., in a configuration file) by computing system 102, for analytics program(s) 104 and/or monitoring app 105.

Referring to step 208 in various embodiments, RSM program 200 identifies memory buffers associated with the additional one or more data records to a memory management function (not shown) of computing system 102. For example, computing system 102 may include a garbage collector function that frees memory space when information within a memory location is "consumed." RSM program 200 configures a memory buffer such that information stored in the memory buffer is protected from the memory management function of computing system 102. The preservation and/or deletion of information within a memory buffer is controlled by information retention program 400. In some embodiments, RSM program 200 may configure two or more memory buffers for a data record (e.g., data type). For example, RSM program 200 configures memory buffer 106 for a data record that is utilized by an analytics program and then deleted; and memory buffer 107 is configured to store the data record until a different analytics program consumes the data record prior to storing the data record in analytics storage 109. In other embodiments, RSM program 200 configures a memory buffer for a data record generated by monitoring app 105 that is not utilized by analytics program(s) 104. RSM program 200 may communicate the discovery of a utilized data record to a user via device 120.

In step 210, RSM program 200 communicates the storage locations for the additional data records. In one embodiment, RSM program communicates the storage locations (e.g., memory buffer identifier) for the additional data records to analytics program(s) 104. In another embodiment, RSM program communicates the storage locations for the additional data records to monitoring app 105. In some embodiments, RSM program 200 communicates a name associated with a storage location of an additional data record, such as memory buffer 107. In another example, RSM program 200 determines that data records are stored in a RAM disk. RSM program 200 communicates the directory structure and file names that are associated with the stored data records to analytics program(s) 104 and/or monitoring app 105. In other embodiments, RSM program 200 communicates a memory address (e.g., a pointer) associated with a storage location of an additional data record, such as a hexadecimal address within computing system 102. In an alternative embodiment, RSM program 200 determines that one or more data records is stored in a database-like structure. RSM program 200 communicates a lookup table and/or index values associated with the one or more data records to analytics program(s) 104 and/or monitoring app 105.

In step 212, RSM program 200 identifies indications associated with records generated by a monitoring application. In one embodiment, RSM program 200 identifies one or more indications that are associated with a data record generated by monitoring app 105 based on a configuration file defined by a user. In an example, RSM program 200 identifies a data record generated by monitoring app 105 that is utilized once then deleted. However, analytics program(s) 104 may apply an indication (e.g., override) to the generated data record identifying the data record as affected by a persistence criteria. In another example, RSM program 200 determines that a generated data record is stored in record storage 108 as part of a summary report from an analytics program. In an alternative embodiment, RSM program 200 identifies an indication that a data record generated by monitoring app 105 was not utilized by analytics program(s) 104. For example, RSM program 200 may store the unutilized data record in analytics storage 109 for subsequent analysis by an administrator of computing system 102.

FIG. 3 is a flowchart depicting operational steps for record storage program 300, a program that determines the storage locations of data records generated by monitoring app 105 and storage locations of the data records and reports of analytics program(s) 104, in accordance with embodiments of the present invention. Record storage program 300 may utilize inputs from multiple instances of analytics program(s) 104 and/or RSM program 200.

In step 302, record storage program 300 obtains record storage information determined by RSM program 200. In one embodiment, record storage program 300 obtains record storage information (e.g., memory addresses, buffer designations, database indices, etc.) for data records stored in RAM and/or one or more memory buffers. In another embodiment, record storage program 300 obtains record storage information designating which data records and/or reports generated by analytics program(s) 104 are assigned to persistent storage.

In decision step 306, record storage program 300 determines whether a record generated by a monitoring application includes an indication that affects the storage of the record. In one embodiment, record storage program 300 determines that a data record generated by monitoring app 105 does not include an indication, such as metadata, related to storing the data record. In another embodiment, record storage program 300 determines that a data record generated by monitoring app 105 includes one or more indications that affect the storage of the data record. In one example, record storage program 300 determines that an instance of a data record generated by monitoring app 105 is not stored to record storage 108 because the instance of the data record occurred outside of an analysis period (e.g., a window of time defined by an analytics program, a sampling period prior to executing an analysis). In another example, record storage program 300 determines that RSM program 200 applied an indication to a data record not utilized by analytics program(s) 104. In another embodiment, record storage program 300 determines that a data record generated by monitoring app 105 includes multiple indications that affect the storage of the data record. In an example, record storage program 300 determines that a user configuration includes an indication to delete a data record; however, analytics program(s) 104 includes (e.g., applies) an indication (e.g., an override) that the data record is stored in analytics storage 109. If record storage program 300 determines that a record generated by a monitoring application includes an indication that affects the storage of the record (Yes branch, decision step 306), then record storage program 300 communicates a record to a designated buffer (step 308).

In step 308, record storage program 300 communicates a record to a designated buffer. In one embodiment, record storage program 300 communicates a data record that includes an indication to a memory buffer designated (e.g., specified, defined) within a configuration file. In another embodiment, record storage program 300 communicates an additional data record to a memory buffer configured by RSM program 200 (referring to FIG. 2, step 212). In some embodiments, record storage program 300 may communicate a record to two or more memory buffers.

In decision step 310, record storage program 300 determines whether to communicate a record to persistent storage. In one embodiment, record storage program 300 determines to communicate a data record to persistent storage based on information defined within a configuration file. In another embodiment, record storage program 300 determines to communicate a data record to persistent storage based on an indication associated with the data record. In some embodiments, record storage program 300 determines to communicate a data record to persistent storage based on a memory buffer that stores the data record. In an example, monitoring app 105 generates a response time data record for an application executing on computing system 102. The response time data record includes an indication that the data record is communicated to memory buffer 106 and memory buffer 107. In addition, record storage program 300 determines that memory buffer 106 is defined (e.g., a default response) in a configuration file, such that data records communicated to memory buffer 106 are stored in record storage 108 unless a data record includes an indication not to store the data record.

In some embodiments, record storage program 300 utilizes default responses defined by computing system 102 to determine which data records are communicated to persistent storage when a data record and/or a configuration file does not dictate the storage or deletion of a data record. In an example, record storage program 300 stores data records to analytics storage 109 that are analyzed by an analytics program executed by computing system 102. In another example, record storage program 300 stores unutilized data records generated by monitoring app 105 to persistent storage prior to disposition by a user. In this example, the data records not utilized by analytics program(s) 104 may be communicated to device 120 for off-line analysis by a user.

In decision step 310, responsive to determining to communicate a record to persistent storage (Yes branch, decision step 310), record storage program 300 communicates the record to a predefined storage location (step 312).

In step 312, record storage program 300 communicates a record to a predefined storage location. In one embodiment, record storage program 300 communicates a data record to a storage location specified within a configuration file that was defined by a user. In another embodiment, record storage program 300 communicates a data record to a storage location specified within a configuration file generated and/or modified by computing system 102. In an example, computing system 102 communicates one or more data records to persistent storage locations based on a predefined configuration for analytics program(s) 104 that was selected by a user. In some embodiments, record storage program 300 utilizes information included in an indication (e.g., metadata) associated with a data record to communicate the data record to a predefined storage location. In other embodiments, record storage program 300 determines that a record is associated with a group of records that includes a report (e.g., summary) by an analytics program(s) 104 and that the report and associated data records are communicated to persistent storage on device 120 for subsequent review by a user.

Referring to decision step 306, responsive to determining that a record generated by a monitoring application does not include an indication that affects the storage of the record (No branch, decision step 306), record storage program 300 communicates a record to a predefined storage location (step 312).

Referring to decision step 310, responsive to determining a record is not communicated to persistent storage (No branch, decision step 310), record storage program 300 terminates.

FIG. 4 is a flowchart depicting operational steps for information retention program 400, a program that determines how long a data record persists in a memory buffer and whether the data record is subsequently stored or deleted, in accordance with embodiments of the present invention. Information retention program 400 may utilize inputs from multiple instances of analytics program(s) 104 and/or monitoring app 105. In some embodiments, information retention program 400 may communicate information related to the storage of data records to record storage program 300.

In step 402, information retention program 400 determines an in-memory data persistence criteria for a record in a buffer. In one embodiment, information retention program 400 obtains data persistence criteria for a data record from user information 103. In one scenario, information retention program 400 determines data persistence criteria for a data record from a configuration file. In another scenario, information retention program 400 determines data persistence criteria for a data record based on a table or database that cross references a data record type, a period of time, and/or triggering events. In an example, information retention program 400 may determine that two factors affect the persistence of a data record. In one case, if the running average of a data record type is above a specified value, the last data record may be deleted after ten additional instances of the data record are generated. However, if the running average of a data record type is below another specified value, the deletion of a data record is based on a duration of time since the data record was generated. In another embodiment, information retention program 400 determines a data persistence criteria based on metadata included in a data record.

In step 404, information retention program 400 utilizes an analytics program to analyze data records generated by a monitoring application. In one embodiment, information retention program 400 utilizes analytics program(s) 104 to analyze data records generated by monitoring app 105 that are associated with a user configuration. In another embodiment, information retention program 400 utilizes analytics program(s) 104 to analyze data records generated by monitoring app 105 that are associated with a trigger (e.g., script, configuration, event, etc.) on a computing system.

In step 406, information retention program 400 optionally communicates with a user. Information retention program 400 communicates, via network 110, with a user of device 120 utilizing UI 122. In one embodiment, information retention program 400 communicates with a user based on triggers defined within a configuration file stored in user information 103. In an example, information retention program 400 communicates with a user of device 120 to obtain authorization to modify which data records are communicated to persistent storage allocated to a user (e.g., record storage 108). In another example, information retention program 400 communicates data persistence criteria to a user of device 120. In another embodiment, information retention program 400 communicates with a user based on one or more triggers utilized by computing system 102 when applying system-defined analytics to the data records generated by monitoring app 105.

In decision step 408, information retention program 400 determines whether analytics affect monitoring app 105. In one embodiment, information retention program 400 utilizes one or more data records and/or results (e.g., reports) from an instance of analytics program(s) 104 to determine that one or more data records generated by monitoring app 105 are not communicated to persistent storage. In another embodiment, information retention program 400 determines that a configuration file for analytics program(s) 104 identifies a data record generated by monitoring app 105 that includes an indication that precludes the storage of the generated data records.

In decision step 408, responsive to determining that analytics program(s) 104 affect monitoring app 105 (Yes branch, decision step 408), information retention program 400 modifies an indication of a record generated by monitoring app 105 (step 410).

In step 410, information retention program 400 modifies an indication of a record generated by monitoring app 105. For example, information retention program 400 modifies an indication of a data record generated by monitoring app 105 that affects the generated data record. An indication may: affect when a record is stored; affect where a record is stored; and override an action defined within a configuration file for the data record. In one embodiment, information retention program 400 determines that a previously unutilized data record is generated by monitoring app 105 and is associated with a triggering event detected by analytics program(s) 104. The previously unutilized data record is not defined to a storage location within a configuration file. Information retention program 400 adds an indication to the unutilized data record that dictates a storage location, such as record storage 108. In another embodiment, information retention program 400 determines that analytics program(s) 104 detects that the status of one or more data records generated by monitoring app 105 differs from a status within user information 103. In an example, information retention program 400 determines that analytics program(s) 104 flag one or more data records as not important. Information retention program 400 overrides the user defined indication to store (e.g., in record storage 108) the one or more flagged data records. In another example, information retention program 400 may modify the indication associated with the one or more not important records from "store in storage" to "store in a memory buffer."

Referring to decision step 408, responsive to determining that does not affect monitoring application (No branch, decision step 408), information retention program 400 stores the results of an analytics program and/or the data records generated by a monitoring application to one or more storage persistent storage locations (step 414).

In step 414, information retention program 400 utilizes persistent storage. In one embodiment, information retention program 400 stores results generated by analytics program(s) 104 to persistent storage. In another embodiment, information retention program 400 stores data records generated by monitoring app 105 to persistent storage. In some embodiments, information retention program 400 stores a combination of data records generated by monitoring app 105 and one or more results of analytics program(s) 104 to persistent storage.

In some embodiments, information retention program 400 appends the results (e.g., report) of analytics program(s) 104 to monitoring data (e.g., data records) stored to record storage 108 (referring to FIG. 3, step 312). In an embodiment, information retention program 400 creates a link or updates a cross reference in a table that associates the results (e.g., report) of analytics program(s) 104 to monitoring data of a user stored in record storage 108.

In other embodiments, information retention program 400 utilizes analytics storage 109. In an embodiment, information retention program 400 stores results generated by analytics program(s) 104 to analytics storage 109 that are not stored to record storage 108. In some embodiments, information retention program 400 determines that computing system 102 stores the aggregated monitoring data and/or analytics results generated as part of a system maintenance and/or quality of service study in analytics storage 109. In other embodiments, information retention program 400 stores aggregated monitoring data and/or analytics results generated as part of developing, testing, and implementing a new version of analytics program(s) 104 and/or monitoring app 105 in analytics storage 109 as opposed to record storage 108.

In step 416, information retention program 400 modifies the state of a record in a buffer based on data persistence criteria. In one embodiment, information retention program 400 utilizes one or more data persistence criteria, determined in step 402, to determine a length of time that a record persists in a memory buffer. In some embodiments, information retention program 400 interfaces with a memory management function of computing system 102 to control the persistence of data records and/or analytics results that are stored in memory buffer 106 and/or memory buffer 107.

In another embodiment, information retention program 400 may utilize one or more triggers and/or events output by analytics program(s) 104 to determine the persistence of a record in a memory buffer. In one scenario, information retention program 400 utilizes a trigger based on a record usage criteria (e.g., by analytics program(s) 104) to determine the persistence of a record in a memory buffer. In one instance, information retention program 400 determines that when a record is analyzed (e.g., consumed) by analytics program(s) 104 that the record is deleted from a memory buffer. In another instance, information retention program 400 determines that analytics program(s) 104 utilizes one or more records in a memory buffer in a loop-and-replace scheme. For example, analytics program(s) 104 perform an analysis based on twenty data points (e.g., records). A record is added to memory buffer 106, which contains a group of twenty records, and the twenty-first data point (e.g., the oldest record) is deleted prior to a subsequent analysis by analytics program(s) 104. In another scenario, information retention program 400 determines that when analytics program(s) 104 stores a report to record storage 108 and/or analytics storage 109, information retention program 400 may delete one or more records utilized to generate the report.

Figure 5:
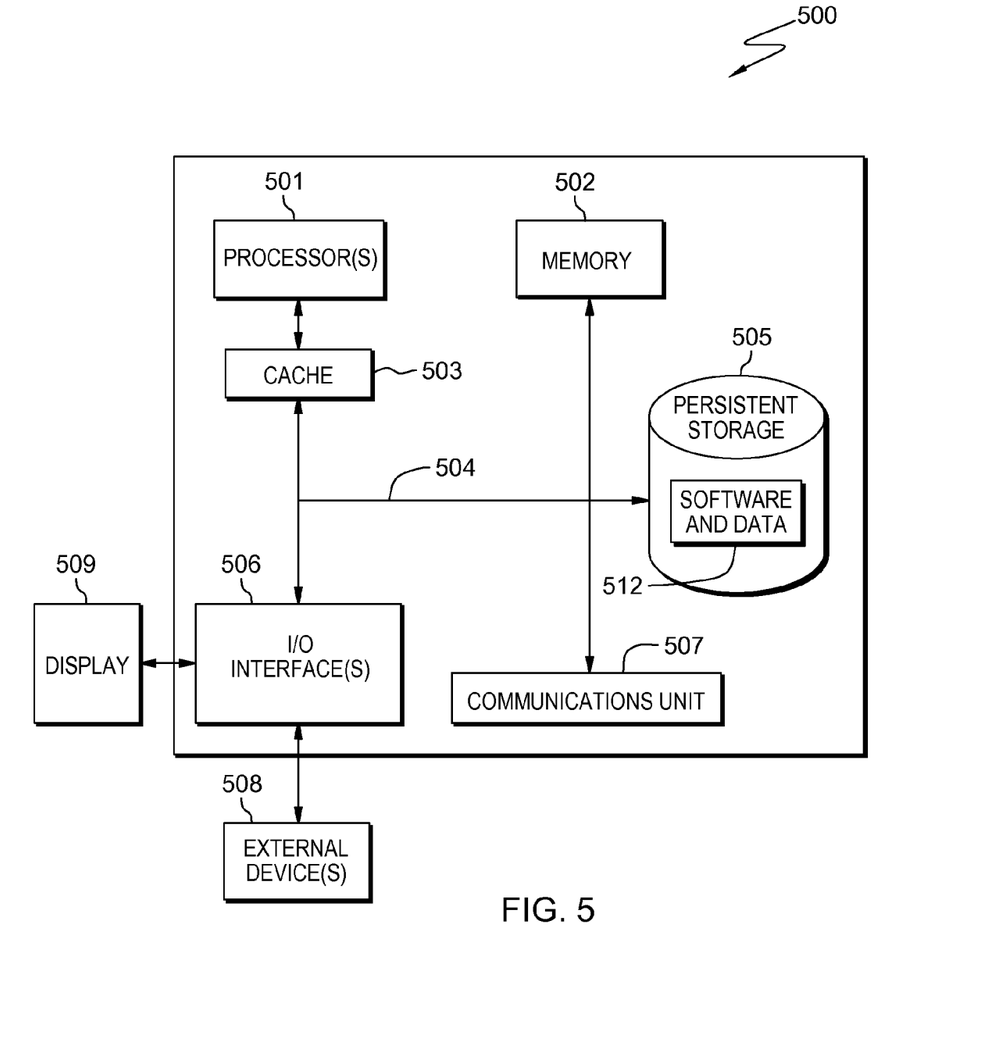
FIG. 5 is a block diagram of components of a computer, in accordance with an embodiment of the present invention.

FIG. 5 depicts computer system 500, which is representative of computing system 102 and device 120. Computer system 500 is an example of a system that includes software and data 512. Computer system 500 includes processor(s) 501, memory 502, cache 503, persistent storage 505, communications unit 507, input/output (I/O) interface(s) 506, and communications fabric 504. Communications fabric 504 provides communications between cache 503, memory 502, persistent storage 505, communications unit 507, and I/O interface(s) 506. Communications fabric 504 can be implemented with any architecture designed for passing data and/or control information between processors (such as microprocessors, communications and network processors, etc.), system memory, peripheral devices, and any other hardware components within a system. For example, communications fabric 504 can be implemented with one or more buses or a crossbar switch.

Memory 502 and persistent storage 505 are computer readable storage media. In this embodiment, memory 502 includes random access memory (RAM). In general, memory 502 can include any suitable volatile or non-volatile computer readable storage media. Cache 503 is a fast memory that enhances the performance of processor(s) 501 by holding recently accessed data, and data near recently accessed data, from memory 502. In an embodiment, with respect to computing system 102 memory 502 may include memory buffer 106 and memory buffer 107.

Program instructions and data used to practice embodiments of the present invention may be stored in persistent storage 505 and in memory 502 for execution by one or more of the respective processor(s) 501 via cache 503. In an embodiment, persistent storage 505 includes a magnetic hard disk drive. Alternatively, or in addition to a magnetic hard disk drive, persistent storage 505 can include a solid-state hard drive, a semiconductor storage device, a read-only memory (ROM), an erasable programmable read-only memory (EPROM), a flash memory, or any other computer readable storage media that is capable of storing program instructions or digital information. In an embodiment, with respect to computing system 102, persistent storage 505 may include record storage 108 and analytics storage 109.

The media used by persistent storage 505 may also be removable. For example, a removable hard drive may be used for persistent storage 505. Other examples include optical and magnetic disks, thumb drives, and smart cards that are inserted into a drive for transfer onto another computer readable storage medium that is also part of persistent storage 505. Software and data 512 are stored in persistent storage 505 for access and/or execution by one or more of the respective processor(s) 501 via cache 503 and one or more memories of memory 502. With respect to computing system 102, software and data 512 includes: user information 103, analytics program(s) 104, RSM program 200, record storage program 300, information retention program 400, and various programs (not shown). With respect to device 120, software and data 512 includes: user interface (UI) 122 and various programs (not shown).

Communications unit 507, in these examples, provides for communications with other data processing systems or devices, including resources of computing system 102 and device 120. In these examples, communications unit 507 includes one or more network interface cards. Communications unit 507 may provide communications through the use of either or both physical and wireless communications links. Program instructions and data used to practice embodiments of the present invention may be downloaded to persistent storage 505 through communications unit 507.

I/O interface(s) 506 allows for input and output of data with other devices that may be connected to each computer system. For example, I/O interface(s) 506 may provide a connection to external device(s) 508, such as a keyboard, a keypad, a touch screen, and/or some other suitable input device. External device(s) 508 can also include portable computer readable storage media, such as, for example, thumb drives, portable optical or magnetic disks, and memory cards. Software and data 512 used to practice embodiments of the present invention can be stored on such portable computer readable storage media and can be loaded onto persistent storage 505 via I/O interface(s) 506. I/O interface(s) 506 also connect to display 509.

Display 509 provides a mechanism to display data to a user and may be, for example, a computer monitor. Display 509 can also function as a touch screen, such as the display of a tablet computer or a smartphone.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for obtaining and storing monitoring information, the method comprising:
   generating, by one or more computer processors, a plurality of instances of one or more data records, based at least in part on a configuration for generating information, wherein the configuration for generating information dictates the generation of data records by one or more monitoring applications;
   determining, by one or more computer processors, that a configuration for analyzing the generated information dictates an analysis of one or more instances of a first data record and one or more instances of a second data record;
   determining, by one or more computer processors, that the plurality of generated instances of data records does not include one or more instances of the second data record;
   in response to determining that the plurality of generated instances of data records does not include one or more instances of the second data record, automatically modifying, by one or more computer processors, the configuration for generating information for the analysis to dictate the generation of instances of the second data record;
   in response to modifying the configuration for generating information for analysis, determining, by one or more computer processors, one or more storage locations and corresponding storage devices to allocate for storing the plurality of generated instances of the dictated data records for analysis, based on the information related to storing the generated information for analysis and further based on the configuration for analyzing the generated information;
   allocating, by one or more computer processors, the determined one or more storage locations and the corresponding storage devices respectively associated with dictated data records; and
   storing, by one or more computer processors, the generated plurality of instances of dictated data records within the one or more allocated storage locations respectively associated with a dictated data record.

2. The method of claim 1, wherein the configuration for generating information includes:
   (i) a first list of data records to be generated by the one or more monitoring applications in response to monitoring one or more events;
   (ii) an indication of a data type associated with each data record of the first list of data records; and
   (iii) information related to one or more storage locations and corresponding storage devices to be allocated for each data record of the first list of data records.

3. The method of claim 2, wherein the information related to one or more storage locations and the corresponding storage devices includes one or more persistence criteria for generated instances of a data record.

4. The method of claim 3, wherein the one or more persistence criteria are selected from the group consisting of a period of time, a value for a number of instances of the data record, one or more triggers, a frequency of analysis, a status of a monitoring application, and an override of a persistence criterion by an analytic application.

5. The method of claim 1, wherein the configuration for analyzing information includes:
   (i) a second list that dictates the one or more data records that are used as input for the analysis;

(ii) information related to the one or more allocated storage locations that store the generated instances corresponding to the one or more dictated data records that are utilized for the analysis;
(iii) a frequency of analysis of the one or more dictated data records; and
(iv) information related to one or more other storage locations and corresponding storage devices to store one or more results of the analysis.

6. The method of claim 1, wherein modifying the configuration for generating information further comprises:
modifying, by one or more computer processors, a first list of data records such that one or more monitoring applications generate instances of the dictated second data record; and
identifying, by one or more computer processors, information related to the storage of instances of the dictated second data record.

7. The method of claim 1, wherein determining the one or more storage locations and the corresponding storage devices to allocate further comprises:
determining, by one or more computer processors, that memory provisioned to a user is insufficient to configure a memory buffer for storing the instances of the dictated second data record; and
allocating, by one or more computer processors, unallocated memory resources of a computing system, for a memory buffer to temporarily store instances of the dictated second data record for analysis.

8. The method of claim 1, further comprising:
In response to determining that an analytics program analyzes instances of the dictated storage records based on a file system structure, allocating, by one or more computer processors, a storage location from memory and configuring the memory as a random-access memory (RAM) disk.

9. A computer program product for obtaining and storing monitoring information, the computer program product comprising:
one or more computer readable storage media and program instructions stored on the one or more computer readable storage media, the program instructions comprising:
program instructions to generate a plurality of instances of one or more data records, based at least in part on a configuration for generating information, wherein the configuration for generating information dictates the generation of data records by one or more monitoring applications;
program instructions to determine that a configuration for analyzing the generated information dictates an analysis of one or more instances of a first data record and one or more instances of a second data record;
program instructions to determine that the plurality of generated instances of data records does not include one or more instances of the second data record;
program instructions to respond to determining that the plurality of generated instances of data records does not include one or more instances of the second data record by automatically modifying the configuration for generating information for the analysis to dictate the generation of instances of the second data record;
program instruction to respond to modifying the configuration for generating information for analysis by determining one or more storage locations and corresponding storage devices to allocate for storing the plurality of generated instances of the dictated data records for analysis, based on the information related to storing the generated information for analysis and further based on the configuration for analyzing the generated information;
program instructions to allocate the determined one or more storage locations respectively associated with dictated data records; and
program instructions to store the generated plurality of instances of dictated data records within the one or more storage allocated locations respectively associated with a dictated data record.

10. The computer program product of claim 9, wherein the configuration for generating information includes:
(i) a first list of data records to be generated by the one or more monitoring applications in response to monitoring one or more events;
(ii) an indication of a data type associated with each data record of the first list of data records; and
(iii) information related to one or more storage locations and corresponding storage devices to be allocated for each data record of the first list of data records.

11. The computer program product of claim 10, wherein the information related to one or more storage locations and the corresponding storage devices includes one or more persistence criteria for generated instances of a data record.

12. The computer program product of claim 11, wherein the one or more persistence criteria are selected from the group consisting of a period of time, a value for a number of instances of the data record, one or more triggers, a frequency of analysis, a status of a monitoring application, and an override of a persistence criterion by an analytic application.

13. The computer program product of claim 9, wherein the configuration for analyzing information includes:
(i) a second list that dictates the one or more data records that are used as input for the analysis;
(ii) information related to the one or more storage allocated locations that store the generated instances corresponding to the one or more dictated data records that are utilized for the analysis;
(iii) a frequency of analysis of the one or more dictated data records; and
(iv) information related to one or more other storage locations and corresponding storage devices to store one or more results of the analysis.

14. The computer program product of claim 9, wherein modifying the configuration for generating information to include generating the second data record further comprising:
program instructions to modify a first list of data records such that one or more monitoring applications generates instances of the dictated second data record; and
program instruction to identify information related to the storage of instances of the dictated second data record.

15. A computer system for obtaining and storing monitoring information, the computer system comprising:
one or more computer processors;
one or more computer readable storage media;
program instructions stored on the computer readable storage media for execution by at least one of the one or more computer processors, the program instructions comprising:
program instructions to generate a plurality of instances of one or more data records, based at least in part on a configuration for generating information, wherein the configuration for generating information dictates the generation of data records by one or more monitoring applications;

program instructions to determine that a configuration for analyzing the generated information dictates an analysis of one or more instances of a first data record and one or more instances of a second data record;

program instructions to determine that the plurality of generated instances of data records does not include one or more instances of the second data record;

program instructions to respond to determining that the plurality of generated instances of data records does not include one or more instances of the second data record by automatically modifying the configuration for generating information for the analysis to dictate the generation of instances of the second data record;

program instruction to respond to modifying the configuration for generating information for analysis by determining one or more storage locations and corresponding storage devices to allocate for storing the plurality of generated instances of the dictated data records for analysis, based on the information related to storing the generated information for analysis and further based on the configuration for analyzing the generated information;

program instructions to allocate the determined one or more storage locations respectively associated with dictated data records; and program instructions to store the generated plurality of instances of dictated data records within the one or more storage allocated locations respectively associated with a dictated data record.

16. The computer system of claim 15, wherein the configuration for generating information includes:
(i) a first list of data records to be generated by the one or more monitoring applications in response to monitoring one or more events;
(ii) an indication of a data type associated with each data record of the first list of data records; and
(iii) information related to one or more storage locations and corresponding storage devices to be allocated for each data record of the first list of data records.

17. The computer system of claim 16, wherein the information related to one or more storage locations and the corresponding storage devices includes one or more persistence criteria for generated instances of a data record.

18. The computer of claim 17, wherein the one or more persistence criteria are selected from the group consisting of a period of time, a value for a number of instances of the data record, one or more triggers, a frequency of analysis, a status of a monitoring application, and an override of a persistence criterion by an analytic application.

19. The computer system of claim 15, wherein the configuration for analyzing information includes:
(i) a second list that dictates the one or more data records that are used as input for the analysis;
(ii) information related to the one or more allocated storage locations that store the generated instances corresponding to the one or more dictated data records that are utilized for the analysis;
(iii) a frequency of analysis of the one or more dictated data records; and
(iv) information related to one or more other storage locations and corresponding storage devices to store one or more results of the analysis.

20. The computer system of claim 15, wherein modifying the configuration for generating information to include generating the second data record further comprising:
program instructions to modify a first list of data records such that one or more monitoring applications generates instances of the dictated second data record; and
program instruction to identify information related to the storage of instances of the dictated second data record.

* * * * *